(12) United States Patent
Jones

(10) Patent No.: US 12,059,968 B2
(45) Date of Patent: Aug. 13, 2024

(54) AC/DC RADIAL WHEEL GENERATION AND RECHARGING SYSTEM WITH WIND ASSIST

(71) Applicant: Antwoine McKinley Jones, State Farm, VA (US)

(72) Inventor: Antwoine McKinley Jones, State Farm, VA (US)

(*) Notice: Subject to any disclaimer, the term of this patent is extended or adjusted under 35 U.S.C. 154(b) by 0 days.

(21) Appl. No.: 18/227,898

(22) Filed: Jul. 28, 2023

(65) Prior Publication Data

US 2024/0034174 A1  Feb. 1, 2024

Related U.S. Application Data

(60) Provisional application No. 63/393,225, filed on Jul. 28, 2022.

(51) Int. Cl.
*H02J 7/00* (2006.01)
*B60L 1/00* (2006.01)
(Continued)

(52) U.S. Cl.
CPC ............... *B60L 53/52* (2019.02); *B60L 1/00* (2013.01); *B60L 55/00* (2019.02); *F03D 9/32* (2016.05);
(Continued)

(58) Field of Classification Search
None
See application file for complete search history.

(56) References Cited

U.S. PATENT DOCUMENTS

| 4,040,582 A | 8/1977 | Krauss |
| 6,857,492 B1 | 2/2005 | Liskey et al. |

(Continued)

FOREIGN PATENT DOCUMENTS

| CH | 700 463 | 8/2010 |
| CN | 200710050885.6 | 6/2009 |

(Continued)

OTHER PUBLICATIONS

"Will These Wind-Powered Cars Be the Future of Travel?", https://news.lenova.com, Nov. 3, 2020.
(Continued)

*Primary Examiner* — Arun C Williams
(74) *Attorney, Agent, or Firm* — Stephen Christopher Swift; Swift & Swift, Attorneys at Law, P.L.L.C.

(57) ABSTRACT

A wheel and wind power electric generator for a motor, comprising: an alternator that rotates with a wheel of a motor vehicle powered by an internal combustion engine, by an electric motor, or by other mean; an armature of an alternator that rotates with windvanes that rotate in an opposite direction from the wheel when the wheel is in motion, wherein the windvanes are spirally curved, so that they are concave in the direction that the wheel turns when the vehicle is going forward, causing the rotor and armature in the alternator to rotate in an opposite direction from the alternator to generate electricity, and the wheel and the windvanes are covered by a hubcap having slots through which air can move in when the vehicle is moving, causing the windvanes to rotate. The electricity generated may be stored in a capacitor or battery, and/or transferred to a power grid.

17 Claims, 9 Drawing Sheets

(51) Int. Cl.
  *B60L 53/52*   (2019.01)
  *B60L 55/00*   (2019.01)
  *F03D 9/32*    (2016.01)
  *H02K 7/18*    (2006.01)
  *H02K 11/04*   (2016.01)

(52) U.S. Cl.
  CPC ........... *H02K 7/1846* (2013.01); *H02K 11/04* (2013.01); *B60L 2210/30* (2013.01); *F05B 2240/941* (2013.01)

(56) References Cited

U.S. PATENT DOCUMENTS

| | | |
|---|---|---|
| 7,652,389 B2 | 1/2010 | Farmer |
| 8,967,302 B2 | 3/2015 | Tran |
| 9,647,487 B2 | 5/2017 | Rogers |
| 9,709,036 B2 | 7/2017 | Skelton et al. |
| 9,837,874 B2 | 12/2017 | Jian et al. |
| 10,160,330 B2 | 12/2018 | Kim |
| 10,358,038 B1 | 7/2019 | Ripley |
| 10,358,039 B1 | 7/2019 | Frierman |
| 10,443,568 B2 | 10/2019 | Lee et al. |
| 10,533,536 B2 | 1/2020 | Shou-Hsun et al. |
| 10,539,120 B2 | 1/2020 | Uliano |
| 10,605,231 B1 | 3/2020 | Corbell, Sr. |
| 10,859,065 B1 | 12/2020 | Li |
| 2003/0132638 A1 | 7/2003 | Simonsen |
| 2009/0200089 A1 | 8/2009 | Friedmann |
| 2010/0301712 A1 | 12/2010 | Amutham |
| 2017/0328272 A1* | 11/2017 | Yamashita ............ F02B 37/013 |
| 2021/0122249 A1 | 4/2021 | Maury et al. |

FOREIGN PATENT DOCUMENTS

| | | |
|---|---|---|
| CN | 205149498 | 4/2016 |
| GB | 2582134 | 9/2020 |
| JP | 2012-255369 | 12/2012 |

OTHER PUBLICATIONS

"Why Your Tires Could Soon Generate Electricity", at https://www.matfoundrygroup.com/blog/Why_your_tires_could_soon_generate_electricity, accessed on Jul. 4, 2022.

* cited by examiner

AC/DC RADIAL WHEEL GENERATION AND RECHARGING SYSTEM WITH WIND ASSIST

CROSS REFERENCE TO RELATED APPLICATION

This application is based on and claims the benefit of Provisional Patent Application Ser. No. 63/393,225, filed Jul. 28, 2022, which is incorporated herein by reference.

BACKGROUND OF THE INVENTION

1. Field of the Invention

The present invention relates to harnessing the energy/inertia created by the angular momentum of the moving wheels of a motor vehicle, and the wind passing the wheels, to generate electricity.

2. Description of the Prior Art

U.S. Pat. No. 4,040,582, issued on Aug. 9, 1977, to Ronald C. Krauss, discloses wind power accessory for a vehicle wheel, in which the wind power is captured using cups attached to the vehicle's wheels. Your invention is distinguishable, because it captures the wind power using wind vanes rather than cups.

U.S. Pat. No. 5,920,127, issued on Jul. 6, 1999, to Philip C. Damron and Jane L. Damron, discloses an unenclosed propeller wind charging system mounted on the roof of an electric vehicle. Your invention is distinguishable, because the vanes are in the vehicle's wheels.

U.S. Pat. No. 6,857,492, issued on Feb. 22, 2005, to Kenneth W. Liskey and Eugene B. Liskey, discloses an airflow driven electrical generator for a moving vehicle in which the wind power is captured using spiral fins around a cylindrical component, that rotates on an axis parallel to the vehicle's direction of movement. Your invention is distinguishable, because it uses vanes around a hub, that rotates on an axis perpendicular to the vehicle's direction of movement.

U.S. Pat. No. 7,652,389, issued on Jan. 26, 2010, to Clint Farmer, discloses an air-wind power system for a vehicle, in which the wind power is captured by unenclosed propellers. Your invention is distinguishable, because its vanes are mounted on a radial wheel.

U.S. Pat. No. 8,967,302, issued on Mar. 3, 2015, to Don Tran, discloses a vehicle air turbine, in which the turbine blades rotate on an axle that is generally perpendicular to the wind flow. Your invention is distinguishable, because in it the vanes rotate within the well of the vehicle's wheels.

U.S. Pat. No. 9,647,487, issued on May 9, 2017, to Richard Rogers, discloses wind-driven recharger for a vehicle battery with a plurality of generators. Your invention is distinguishable, because has a single alternator for each wheel.

U.S. Pat. No. 9,709,036, issued on Jul. 18, 2017, to Paul E. Skelton and Robert S. Cutler, discloses a vehicle mounted electrical generator, with a turbine that can rotate horizontal, with a windsock that causes it to face into the wind. Your invention is distinguishable, because it has no windsock, and is rigidly mounted on the vehicle, so that the device as a whole does not rotate.

U.S. Pat. No. 9,837,874, issued on Dec. 5, 2017, to Linni Jian, Jin Wei and Yujun Shi, discloses a flywheel energy storage device, wind power generation system, and vehicle energy feedback brake system. Your invention is distinguishable, because it does not have a fly wheel.

U.S. Pat. No. 10,160,330, issued on Dec. 25, 2018, to Chuil Peter Kim, discloses a wind-powered system for vehicles, having a plurality of wind tunnels. Your invention is distinguishable, because it does not have tunnels for the wind.

U.S. Pat. No. 10,358,038, issued on Jul. 23, 2019, to Peter W. Ripley, discloses a wind turbine for an electric car, that is mounted in the car's roof. Your invention is distinguishable, because it is mounted in the vehicles wheel wells.

U.S. Pat. No. 10,358,039, issued on Jul. 23, 2019, to Edward Michael Frierman, discloses a vehicle turbine system, having an axle that is generally perpendicular to the wind. Your invention is distinguishable, because it is mounted in the wheel wells.

U.S. Pat. No. 10,443,568, issued on Oct. 15, 2019, to Shou-Hsun Lee and Chun-I Li, discloses a wind power generating device for transportation vehicles, having an automatic braking mechanism to prevent it from turning too fast when the wind is strong. Your invention is distinguishable, because it does not have a braking mechanism.

U.S. Pat. No. 10,533,536, issued on Jan. 14, 2020, to Shou-Hsun Lee and Chun-I Li, discloses a wind power generating device installed in a vehicle, that is designed to continue rotating and generating electricity for a while after the wind stops, and is kept rotating for a while by balls in chambers and permanent magnets around a rotating disc. Your invention is distinguishable, because it does not have permanent magnets or balls in chambers.

U.S. Pat. No. 10,539,120, issued on Jan. 21, 2020, to Eti Galvani Uliano, discloses electricity-generating wind turbines mounted on truck trailers, where the axles of the turbines are vertical. Your invention is distinguishable, because in it the axles are horizontal.

U.S. Pat. No. 10,605,231, issued on Mar. 31, 2020, to Wayne Douglas Corbell, Sr., discloses an electric turbine charger system for a vehicle, with tubes with open ends that run the length of the vehicle. In the tubes are fans the capture energy from the wind that is converted into electric power. Your invention is distinguishable, because in it the wind vanes are located in the wheel wells.

U.S. Pat. No. 10,859,065, issued on Dec. 8, 2020, to Li Li, discloses a supplemental propulsion system for vehicles, in which a rotating cylinder is set traverse (diagonal) to the vehicle headwind. Your invention is distinguishable, because the vane axle is set perpendicularly to the vehicle headwind.

U.S. Patent Application Publication No. 2003/0132638, published on Jul. 17, 2003, to William Thomas Simonsen, discloses a wind-powered automobile, with a wind turbine located in the engine compartment. Your invention is distinguishable, because the windvanes are located in the wheel wells.

U.S. Patent Application Publication No. 2009/0200089, published on Aug. 13, 2009, to John Friedmann, discloses wind-powered, battery-energized electric vehicle, with at least two "wind-electric generators" similar to your invention, and "venturi effect structures" that funnel the air to the generators. Your invention is distinguishable, because it does not have the venturi effect structures, and is located in the wheel wells of the vehicle.

U.S. Patent Application Publication No. 2010/0301712 A1, published on Dec. 2, 2010, to Velayutham Kadal Amutham, discloses a wheel motor with rotating stator. Your invention is distinguishable, in that it has vanes that assist in the generation of electrical power.

U.S. Patent Application Publication No. 2021/0122249, published on Apr. 29, 2021, to Charles L. Maury et al., discloses a wind based electric generation system for vehicles, in which small individual generation units have inputs at wind pressure peak areas on a vehicle, and outlets at low pressure locations on a vehicle. Your invention is distinguishable, because it has generation units located in wheel wells.

British Patent No. 2582134, published on Sep. 16, 2020, to Andrew Wood, discloses an electric vehicle, with an onboard charge storage device that can be recharged by an onboard charge wind turbine while the vehicle is moving. Your invention is distinguishable, because it has a rim radial wheel that the edges of the wind vane fit within.

Swiss Patent No. 700 463, published on Aug. 31, 2010, to Alfred Weidmann, discloses a vehicle that has wind turbines arranged next to each other, where each wing turbine is provided with a generator and is driven by wind flowing through the vehicle. Your invention is distinguishable, because it is located in the wheel wells.

Japanese Patent No. 2012-255369, published on Dec. 27, 2012, to Mikami Hiroyasu, discloses a wind-receiving rotor which is attached to the front part of an automobile. Your invention is distinguishable, because it has a rim radial wheel that the edges of the wind vane fit within.

Chinese Patent Application No. 200710050885.6, published on Jun. 24, 2009, to Shiliang Zhu, discloses an engine generating set utilizing kinetic energy and wind energy, in which a wheel generates electricity. Your invention is distinguishable, in that it has wind vanes attached to the wheels.

Chinese Patent Application No. 205149498 U, published on Apr. 13, 2016, to Hunan Mechanical & Electrical Polytechnic, discloses a wind-powered electric generator automobile wheel hub motor. Your invention is distinguishable, in that it includes wind vanes and flaps.

An article entitled, "Will These Wind-Powered Cars Be the Future of Travel?", https://news.lenova.com, 3 Nov. 2020, shows a massive electric generating windmill mounted above an electric car. Your invention is distinguishable, because in it the wind vanes are in the wheel wells.

A webpage entitled, "Why Your Tires Could Soon Generate Electricity", at https://www.matfoundrygroup.com/blog/Why_your_tires_could_soon_generate_electricity, accessed on Jul. 4, 2022, discloses harvesting static electricity from within vehicle tires to generate electric current. Your invention is distinguishable, because it does not harvest static electricity.

None of the above inventions and patents, taken either singly or in combination, is seen to describe the instant invention as claimed.

SUMMARY OF THE INVENTION

The present invention is a system including a wheel containing an inertia and wind driven electrical generating device. Its components include: a modified vehicle rim, bearings, spinner windvanes, shaft, connector, bracket, bolts, wheel cap, and an alternator with a wiring harness. Also included: a voltage regulator, capacitor pack, and a control unit.

Accordingly, it is a principal object of the invention to provide a means of producing electrical power to re-charge the battery pack of an electric vehicle.

It is another object of the invention to produce enough electrical energy to power the vehicle on the state and interstate highway systems.

It is a further object of the invention to eliminate the need for recharging stations.

Still another object of the invention is to allow a vehicle to continue to generate electrical energy while in a stationary position.

A final object of the invention is to allow the vehicle to discharge the entirety or a percentage of its capacitor pack charge and/or its battery charge, at discharge stations, which are in battery farms, organized to sell this power back to the electrical grid.

It is also an object of the invention to provide improved elements and arrangements thereof in an apparatus for the purposes described which is inexpensive, dependable and fully effective in accomplishing its intended purposes.

These and other objects of the present invention will become readily apparent upon further review of the following specification and drawings.

BRIEF DESCRIPTION OF THE DRAWINGS

Similar reference characters denote corresponding features consistently throughout the attached drawings.

Similar reference characters denote corresponding features consistently throughout the attached drawings.

DETAILED DESCRIPTION OF THE PREFERRED EMBODIMENTS

The present invention is a wheel containing an inertia and wind driven electrical generating device. Its design consists of a modified vehicle rim, bearings, spinner wind vanes, shaft, connector, bracket, bolts, wheel cap, and an alternator with a wiring harness. Also included are a voltage regulator, capacitor pack, and control unit.

There are several disciplines of science within the operation of this invention. Only the most prominent will be described herein, starting with the science of the wind.

Power produced by the wind is proportional to the cube of the wind speed. This result is readily derived from the kinetic energy of the wind. The mass of air (m) with speed or velocity (v) and density (p) flowing per a unit of time through area (A) swept by the blades of a conventional horizontal axis turbine is pAV. Thus, the kinetic energy of the mass of air is given by:

$$\text{Kinetic energy} = \tfrac{1}{2}mV^2 = \tfrac{1}{2}pAV^3.$$

The maximum fraction of this kinetic energy that can be extracted from the wind is $16/27$ or 0.593. Thus, the theoretical maximum energy output of a wind turbine is $(16/27)(\tfrac{1}{2}pAV^3) = 16/54(pAV^3) = 0.296$.

The process of energy conversion leads to power reduction, which varies with the type of wind turbine and aerogenerator, and is roughly one-third of the theoretical maximum energy output. Hence: Available power output=(⅔)(¹⁶/₅₄)(pAV³)≈(³²/₁₆₂)(pAV³)≈0.2(pAV³).

If the diameter of the blades of the rotor system is D, then the foregoing equation becomes:

Available power output≈0.057πpD²V³.

The power available for a given wind speed is thus proportional to the square of the rotor diameter.

Additional quantities requiring definition are:

Power Coefficient (Cp)=(Power Output of Wind Turbine)/(½pAV³)

Overall Power Coefficient (Cp)=(Power Output at Generator)/(½pAV³)

The basic power formula (used herein) is P=V×I. The voltage (V) times the current (I in amps) gives you the power in watts.

This is accomplished, of course, by the kinetic output of the wind. Those formulas have been shown earlier.

Figure 1:
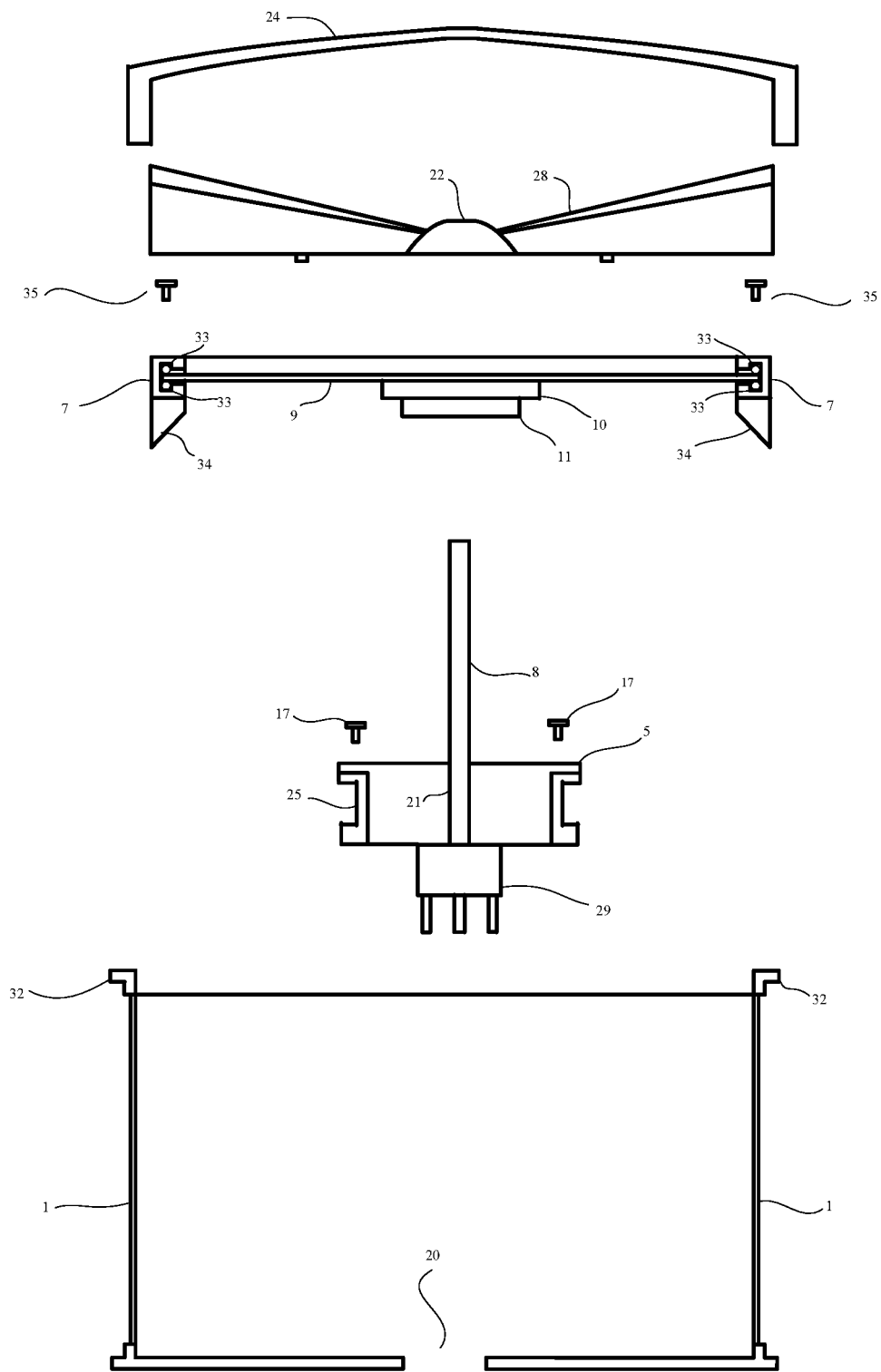
FIG. 1 is an exploded view of the outer part of the preferred embodiment of the invention.
Figure 2:
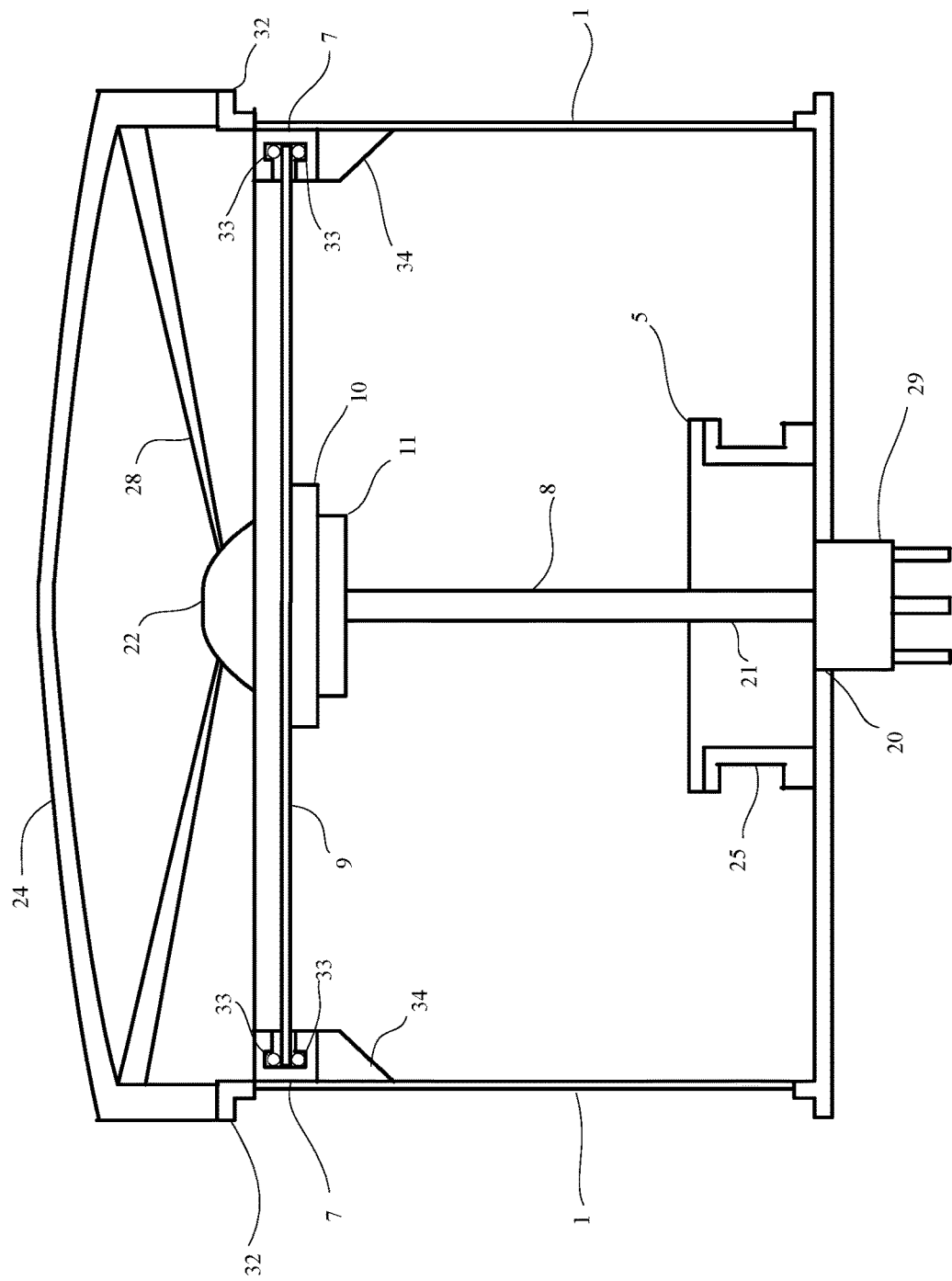
FIG. 2 is an assembled view of the outer part of the preferred embodiment of the invention.
Figure 3:
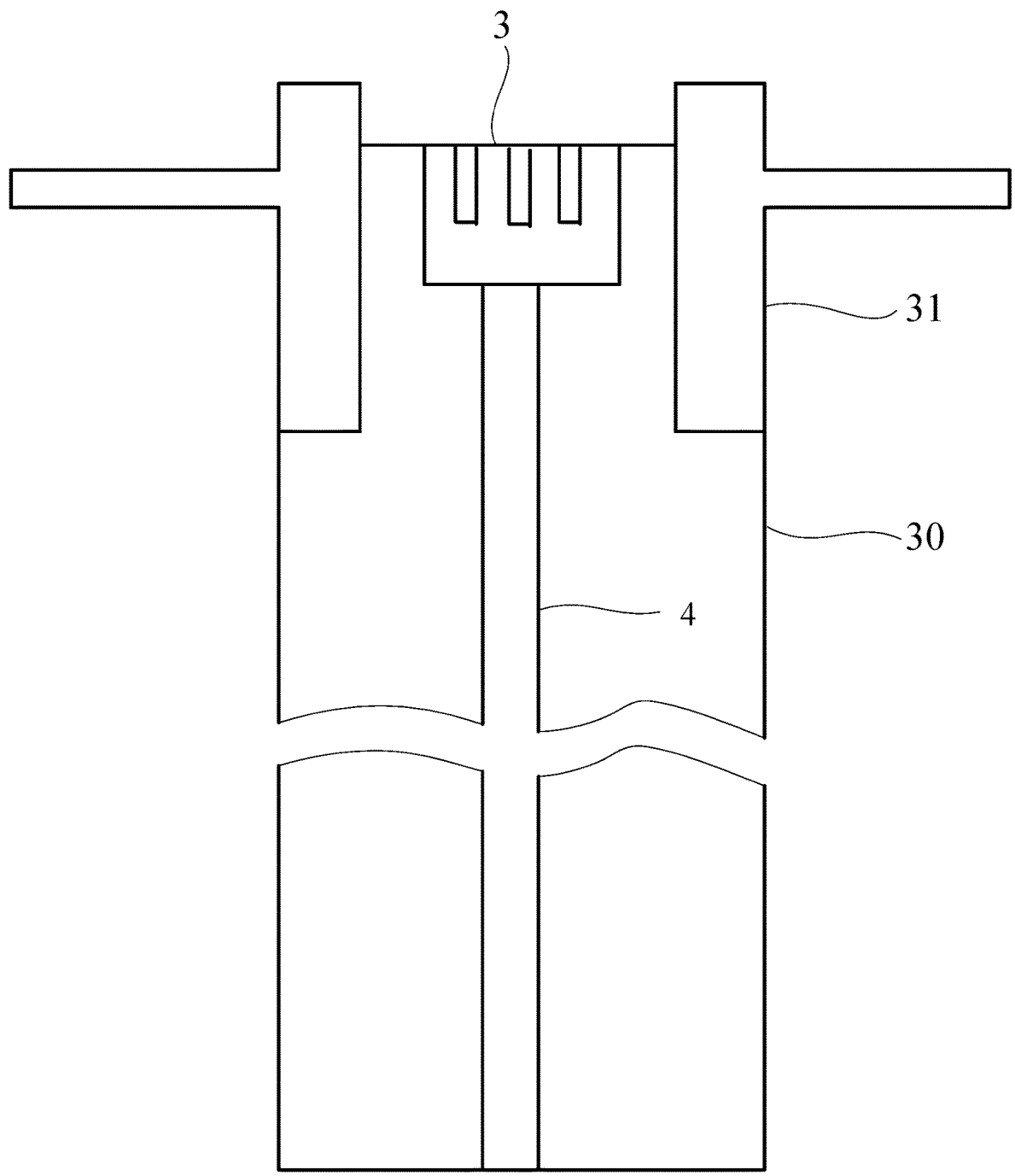
FIG. 3 is an assembled view of the inner part of the preferred embodiment of the invention.
Figure 4:
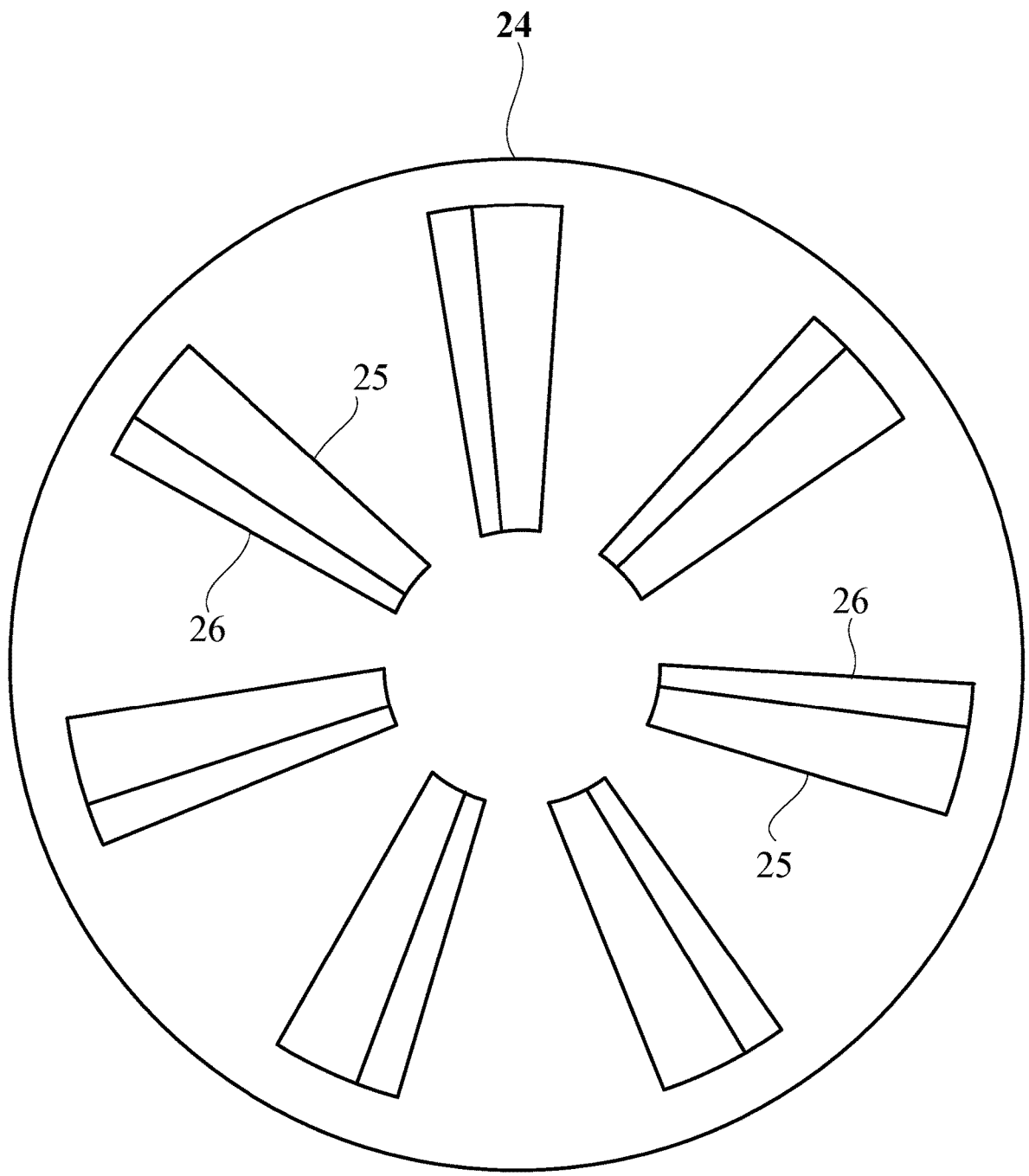
FIG. 4 is a front elevational view of the hub cap covering the wheels and wind vane of the preferred embodiment of the invention

The present invention includes the following parts:
Modified American standard radial rim 1 shown in FIGS. 1 and 3.
Spinner wind vanes 2 in FIG. 3.
Bearings 33 in FIGS. 1 and 2.
Main connector shaft 4 in FIG. 3.
Alternator/generator 5 in FIGS. 1 and 3.
Connector plug 29 in FIG. 1, fitting in socket 3 in FIG. 3.
Mounting bracket 7 in FIGS. 1 and 2.
Modified axle shaft 8 in FIGS. 1 and 2.
Modified axle spindle 9 in FIGS. 1 and 2.
Connectors 10 and 11 between modified axle shaft and spindle in FIGS. 1 and 2.
Hub cap 24.
Conductor shaft 13 in alternator 5 in FIG. 1.
Conductor and conductor shaft 4 in FIG. 3.
Vehicle axle 30.
Connector between vehicle wheel and axle 31.
Bolts 17, 18 and 35 in FIG. 1.
Opening for plug 20 in FIGS. 1 and 2.

The present invention includes a hub cap 24, which covers spinner wind vanes 28. The wind vanes are mated with a spinner 9. The hubcap 24 allows airflow, through flap openings 25, into the wind vanes 26 when the vehicle is in motion.

The hubcap is made to fit the invention's modified rim. The flaps or openings are preferably six inches long by three inches wide.

The hubcap is secured by a snap ring located in the retaining band of the hubcap (not shown in the drawings), allowing it to snap into place.

The radial rim 32 is modified to be at least twelve inches in depth. It has a negative offset. A metal retaining ring 9 is used to secure the spinner wind vanes to the rim. It secures spinner wind vane bearings in the bearing track located on the inside lip of the tire seat.

The track 7 has tabs 34 attached to it to allow for it to be bolted to an inner lip. The retaining ring tabs are located in the exact location as the bearing track to ensure that the track does not move.

Figure 5:
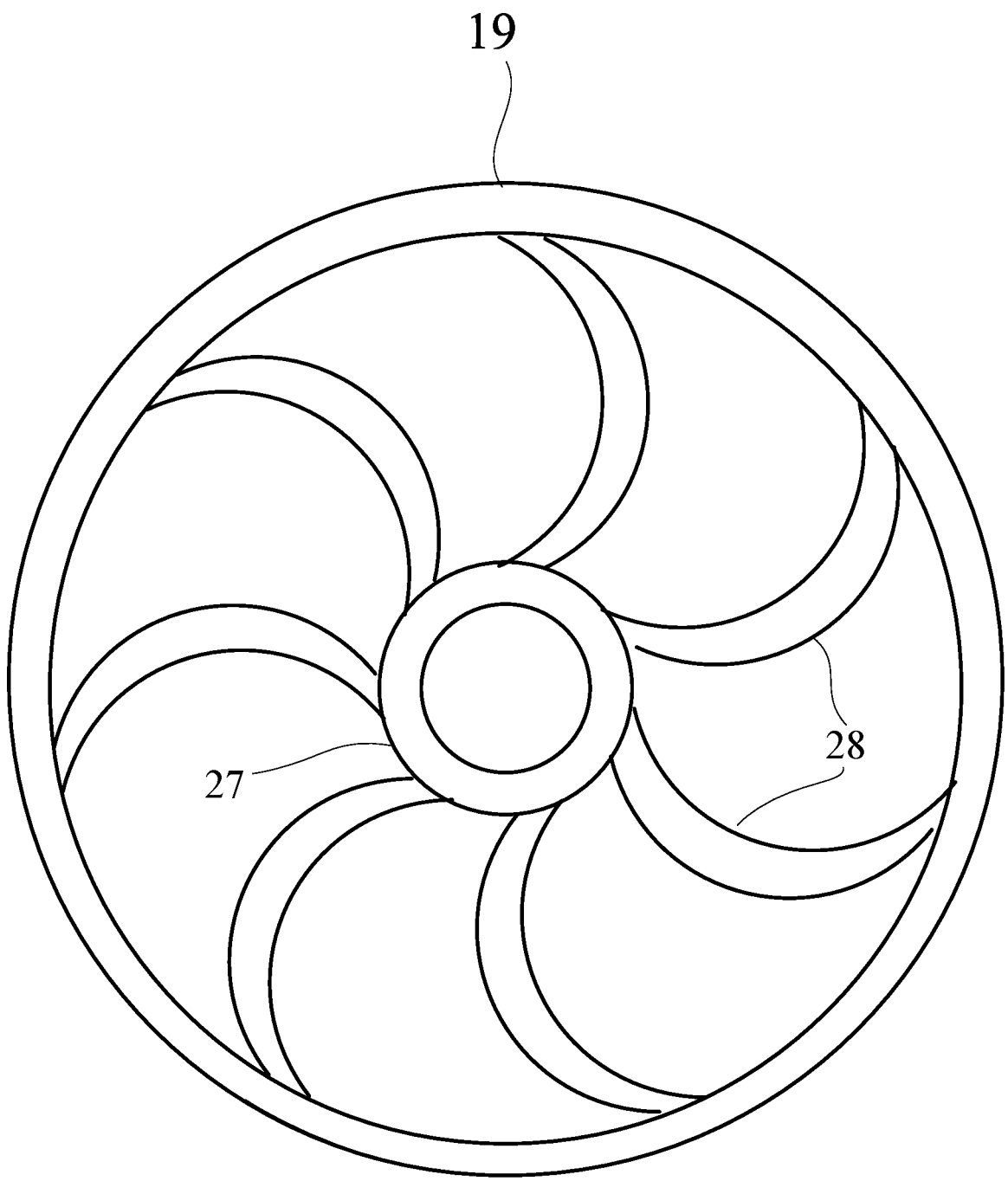
FIG. 5 is a front elevational view of the wind vane attached to the wheels of the preferred embodiment of the invention.

The spinner windvanes 28 in FIG. 5 are retained in the bearing track. This track reduces friction encountered in the angular rotation of the windvanes. It allows greater rotation through less force.

The spinner windvanes are connected to a hub block on the back of the spinner. The hub block connects to the main connector shaft. The main connector shaft extends through the hub block and extends to the center of the spinner wind vanes on the front. Five bolts 35 in FIG. 1 fasten the center of the spinner wind vanes to the main connector shaft.

Preferably, the rim has a diameter of twenty inches, the individual wind vanes are nine inches long and are slid into spots on the spinner, and the wind vanes are two inches from the end of the spinner.

Preferably, the wind vanes are three inches thick, and are molded plastic. Preferably, the wind vanes are angled at forty-five to ninety degrees.

The main connector shaft is connected to the alternator and is preferably five inches long and one-quarter inch in diameter. The alternator shaft connects to the main connector shaft by a block with preferably two bolts.

The alternator is mounted to a bracket. The bracket is mounted to bolts that are located between the wheel mounting bolts. This allows for the removal of the mounting bracket, without having to remove the wheel from the spindle.

The alternator, once bolted into place, causes the male plug, on the back of the alternator, to mate with the female plug located on the modified spindle and axle. The female plug's wires run through the modified axle, and exit out of the back of the modified axle.

The wiring harness of the alternator includes a power wire, neutral and ground. The wiring connects to a central control unit that contains a regulator. This enables connecting the vehicle's capacitor pack and/or battery pack and power system. (Not shown in drawings.)

There are no other full electric vehicles or hybrids that utilize the air in such a manner.

This invention utilizes a source of inefficiencies in every vehicle. Every vehicle designer has tried to eliminate drag in order to make their combustion-based vehicles more efficient.

The instant invention uses the parasitic drag created by the air flowing around the vehicle. The drag increases the faster you travel in the vehicle, which increases the rotational spin of the windvanes, which either increases the wattage, or at least maintains the wattage at a defined level.

The present invention solves numerous problems. The first problem that it solves is the need to plug in to recharge the battery pack. It accomplishes this by being able to recharge the battery pack while the vehicle is moving.

The second problem that it solves is what is called range anxiety. Range anxiety is the anxiety developed over running out of a charge on a long trip and having no place to recharge the vehicle's battery pack.

The invention solves this problem in two ways: first, at speed of greater than twenty-five miles per hour, the device produces enough electricity to power the electric motors without help or battery output. Second, it recharges the battery pack as the vehicle travels along the highway. This eliminates the need to stop and plug in the vehicle. Third, it lessens the need to increase the usage of fossil fuels, by eliminating the need to plug into the power grid. Fourth, it eliminates the need to build out an expensive power-consuming electrical infrastructure to recharge the batter packs. Fifth, it creates a market for the unused power in the capacitor packs and/or battery packs, by allowing vehicles to sell the entirety of their capacitor pack or a portion of it, and/or sell battery power to discharge stations, which store the power in battery farms, which in turn sell power to electric utilities.

Customers of the invention may include:
1. Wheel manufacturers.
2. Electric and hybrid vehicle manufacturers.
3. Tractor trailer manufacturers.
4. Trailer manufacturers.
5. Train car manufacturers.
6. Motorcycle, scooter and moped manufacturers.
7. Farming and mining equipment manufacturers.

Figure 6:
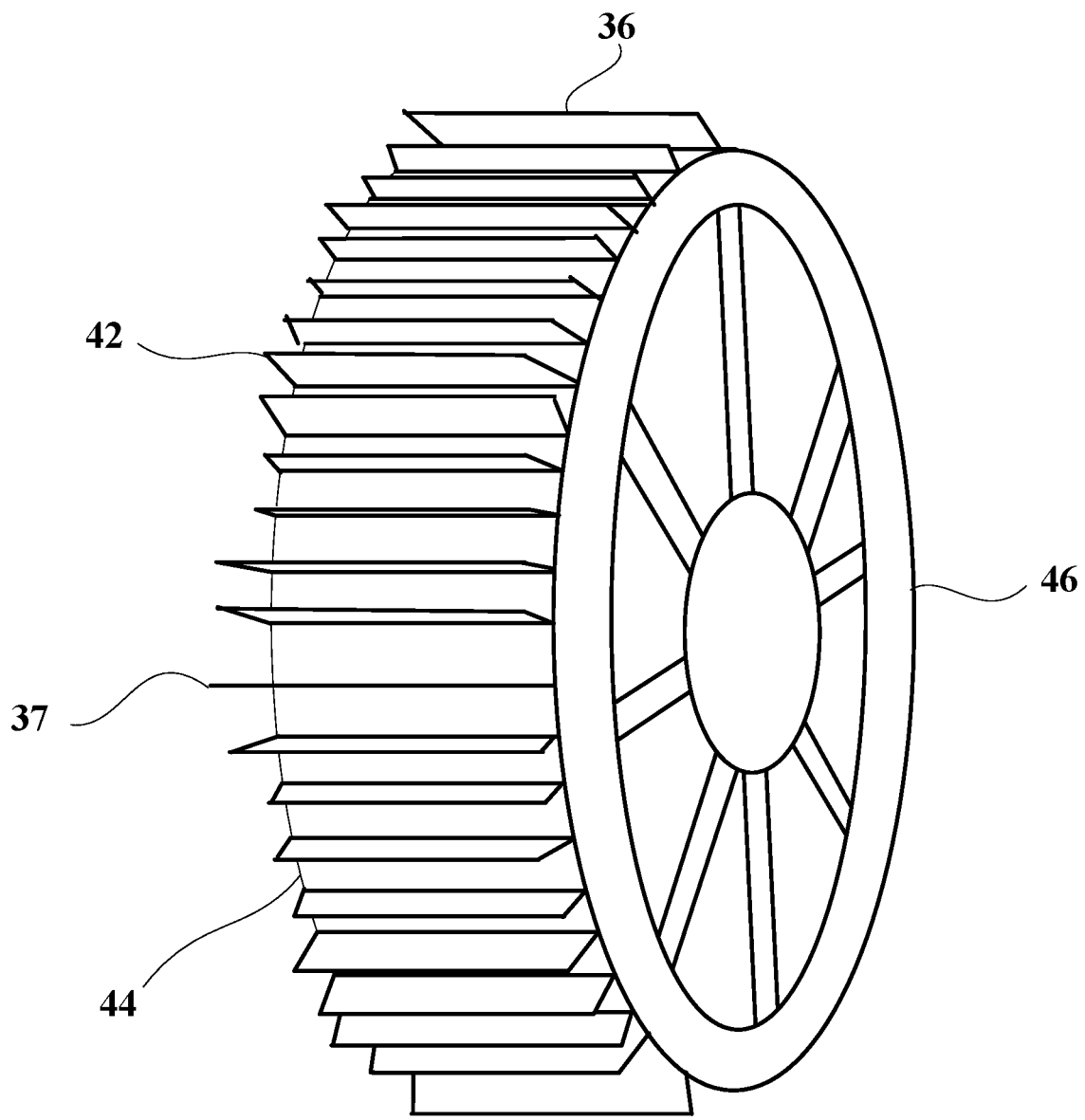
FIG. 6 is a left side front perspective view of the safety cap.
Figure 7:
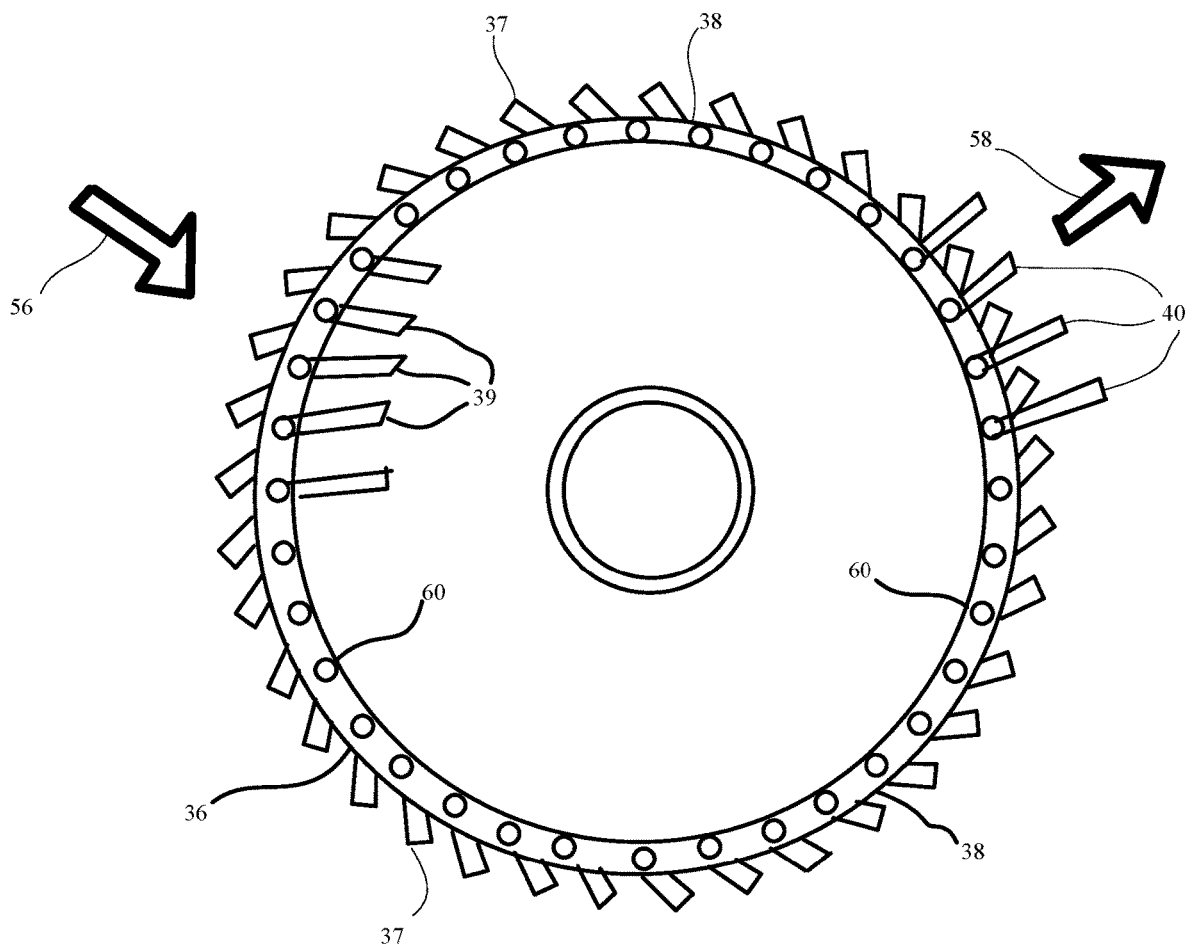
FIG. 7 is a rear view showing the inside of the safety cap.
Figure 8:
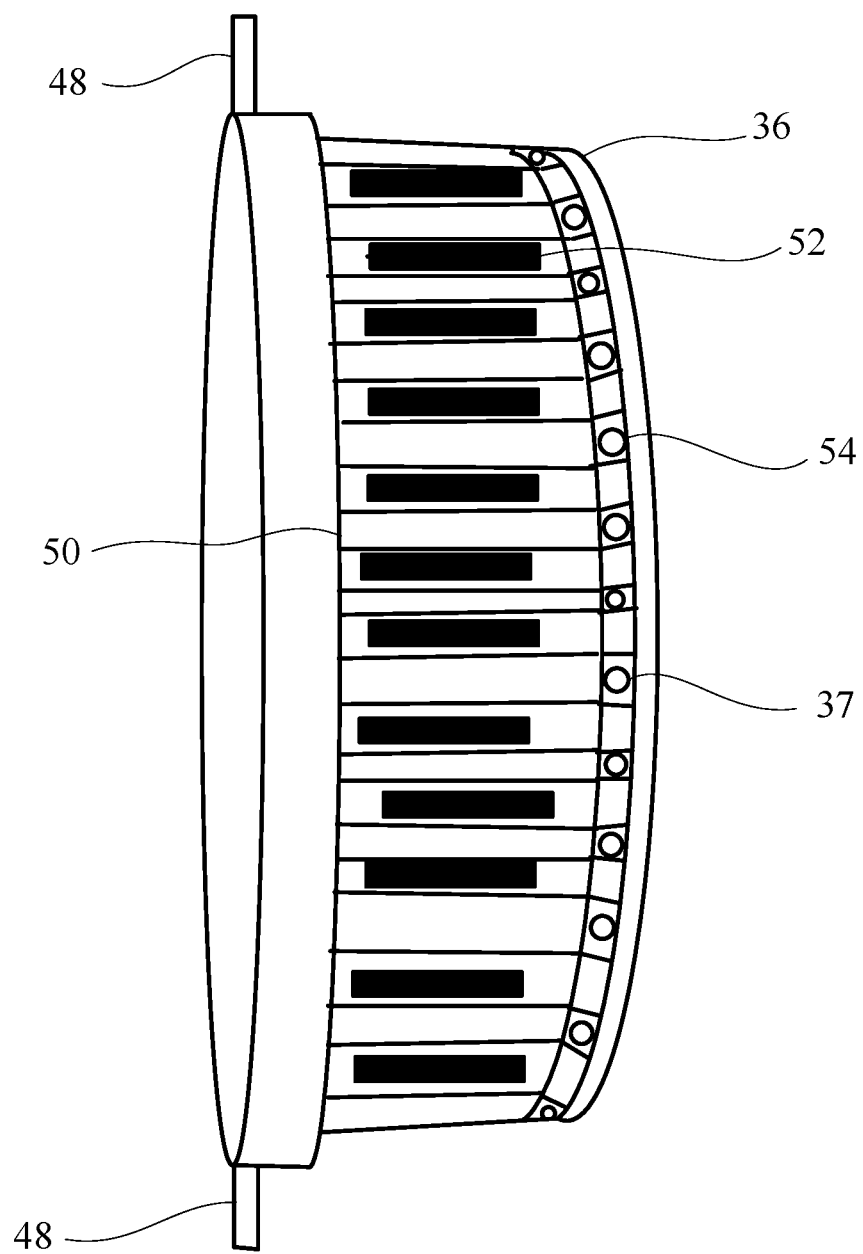
FIG. 8 is a left side rear perspective view of the safety cap.

An optional feature of the invention is the "safety cap", which is an alternative embodiment of the hub cap described above. FIG. 6 is a left side front perspective view of the safety cap. FIG. 7 is a rear view showing the inside of the safety cap. FIG. 8 is a left side rear perspective view of the safety cap.

The safety cap 36 is bolted to the inside edge of the rim on a tab. The safety cap has horizontal slots 37. As the wheel turns, the edge over each flap cuts into the air flow created by the vehicles forward motion. This air flow (called drag) is forced into the slots. When the appropriate pressure from the airflow (or drag) is reached, the flaps will open, and the airflow is allowed inside the wheel generator, to increase the rotational rate of the spinner, thus increasing the frequency of rotation and the voltage and current produced.

FIG. 7 shows an inside view of the safety cap, with the flaps 39 and 40 open. When each slot is out of the direct airflow (or drag) of the wheel well, the flaps 38 close. When the flap 40 is on the back side of the wheel, it is forced open to allow the airflow to escape the wheel.
This explains the purpose of the safety cap embodiment of the hubcap, in operation with the wheel generator.

Figure 9:
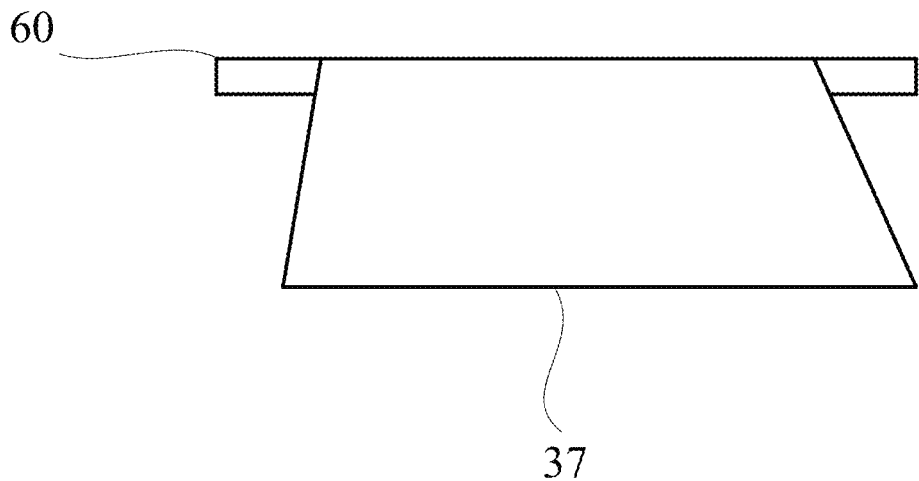
FIG. 9 is a detail view of a flap and its hinge peg.

The second reason for the safety cap, is that it protects the spinner from coming into contact with road debris, animals, curbs, or any other foreign object or material that will damage the spinner and wheel generator. It also keeps people from deliberately sticking body parts or objects into the wheel generator, to cause it or them harm, as can be seen by looking at FIGS. 8 and 9.

It is to be understood that the present invention is not limited to the embodiments described above, but encompasses any and all embodiments within the scope of the following claims.

I claim:

1. A wheel generator for a motor vehicle powered by an internal combustion engine, comprising:
    an alternator that rotates with a wheel of a motor vehicle powered by an internal combustion engine;
    an armature and rotor of an alternator that rotates with windvanes that rotate in an opposite direction from the wheel when the wheel is in motion;
    wherein the windvanes are spirally curved, so that they are concave in the direction that the wheel turns when the vehicle is going forward, causing the rotor and armature in the alternator to rotate in an opposite direction from the wheel, when the wheel is in motion, to generate electricity.

2. The wheel generator for a motor vehicle powered by an internal combustion engine according to claim 1, wherein:
    the wheel and the windvanes are covered by a hubcap having slots through which air can move in when the vehicle is moving, causing the windvanes to rotate.

3. The wheel generator for a motor vehicle powered by an internal combustion engine according to claim 2, wherein:
    the slots in the hubcap are covered by flaps that are biased toward a closed position, but are opened by air pressure when the vehicle is moving forward.

4. The wheel generator for a motor vehicle powered by an internal combustion engine according to claim 1, wherein:
    the rotation of the wheel and the windvanes in opposite directions causes the alternator to generate electricity that can be stored in one or more components of the vehicle, selected from the group comprising capacitors and batteries.

5. The wheel generator for a motor vehicle powered by an internal combustion engine according to claim 1, wherein:
    the rotation of the wheel and the windvanes in opposite directions causes the alternator to generate electricity that can be used to power lights, heating, air conditioning, radios, and appliances in the vehicle.

6. The wheel generator for a motor vehicle powered by an internal combustion engine according to claim 1, wherein:
    alternating current generated by the alternator is converted to direct current using a rectifier.

7. A wheel generator for an electrically-powered motor vehicle, comprising:
    an alternator that rotates with a wheel of a motor vehicle powered by an electric motor;
    a rotor and armature of an alternator that rotates with windvanes that rotate in an opposite direction from the wheel when the wheel is in motion;
    wherein the windvanes are spirally curved, so that they are concave in the direction that the wheel turns when the vehicle is going forward, causing the rotor and armature in the alternator to rotate in an opposite direction from the wheel, when the wheel is in motion, to generate electricity.

8. The wheel generator for an electrically-powered motor vehicle, according to claim 7, wherein:
    the wheel and the windvanes are covered by a hubcap having slots through which air can move in when the vehicle is moving, causing the windvanes to rotate.

9. The wheel generator for an electrically-powered motor vehicle, according to claim 8, wherein:
    the slots in the hubcap are covered by flaps that are biased toward a closed position, but are opened by air pressure when the vehicle is moving forward.

10. The wheel generator for an electrically-powered motor vehicle, according to claim 7, wherein:
    the rotation of the wheel and the windvanes in opposite directions causes the alternator to generate electricity that can be stored in one or more components of the vehicle, selected from the group comprising capacitors and batteries.

11. The wheel generator for an electrically-powered motor vehicle, according to claim 7, wherein:
    the rotation of the wheel and the windvanes in opposite directions causes the alternator to generate electricity that can be used to power lights, heating, air conditioning, radios, and appliances in the vehicle.

12. The wheel generator for a motor vehicle powered by an internal combustion engine according to claim 7, wherein:
    alternating current generated by the alternator is converted to direct current using a rectifier.

13. A method of generating electricity using the wheel of a vehicle, comprising:
    rotation of an alternator by connection with a wheel of a motor vehicle;
    rotation of a rotor and armature of the alternator by connection with windvanes that rotate in an opposite direction from the wheel when the wheel is in motion;
    wherein spiral curvature of the windvanes, that are concave in the direction that the wheel turns when the vehicle is going forward, causing the rotor and armature in the alternator to rotate in an opposite direction from the wheel, when the wheel is in motion, to generate electricity.

14. The method of generating electricity using the wheel of a vehicle, according to claim 13, wherein:
electricity generated in the vehicle is transmitted to an electric power grid.

15. The method of generating electricity using the wheel of a vehicle, according to claim 13, wherein:
the rotation of the wheel and the windvanes in opposite directions causes the alternator to generate electricity that can be stored in one or more components of the vehicle, selected from the group comprising capacitors and batteries.

16. The method of generating electricity using the wheel of a vehicle, according to claim 13, wherein:
the rotation of the wheel and the windvanes in opposite directions causes the alternator to generate electricity that can be used to power lights, heating, air conditioning, radios, and appliances in the vehicle.

17. The method of generating electricity using the wheel of a vehicle, according to claim 13, wherein:
alternating current generated by the alternator is converted to direct current using a rectifier.

\* \* \* \* \*